United States Patent
Kako (10) Patent No.: US 10,949,141 B2
(45) Date of Patent: Mar. 16, 2021

(54) PRINTER CONFIGURED TO PERFORM PRINTING ON A PRINT-RECEIVING MEDIUM AND COMPUTER-READABLE MEDIUM

(71) Applicant: BROTHER KOGYO KABUSHIKI KAISHA, Nagoya (JP)

(72) Inventor: Keigo Kako, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/234,909

(22) Filed: Dec. 28, 2018

(65) Prior Publication Data

US 2019/0227754 A1    Jul. 25, 2019

(30) Foreign Application Priority Data

Jan. 23, 2018   (JP) .............................. JP2018-009029

(51) Int. Cl.
*G06F 3/12*        (2006.01)
*G06K 15/00*       (2006.01)

(52) U.S. Cl.
CPC ............ *G06F 3/123* (2013.01); *G06F 3/1204* (2013.01); *G06F 3/1284* (2013.01); *G06K 15/4055* (2013.01)

(58) Field of Classification Search
CPC ...... G06F 3/123; G06F 3/1204; G06F 3/1284; G06F 8/61; G06F 8/65; G06F 8/658;
(Continued)

(56) References Cited

U.S. PATENT DOCUMENTS

2007/0169105 A1    7/2007   Amberny et al.
2011/0208998 A1    8/2011   Hosaka
(Continued)

FOREIGN PATENT DOCUMENTS

JP         2004096973 A     3/2004
JP         2007159120 A     6/2007
(Continued)

OTHER PUBLICATIONS

Japanese Notice of Reasons for Refusal dated Jan. 15, 2021 received in Japanese Patent Application No. 2018-009029, together with an English-language translation.

*Primary Examiner* — Kent Yip
(74) *Attorney, Agent, or Firm* — Scully, Scott, Murphy & Presser, P.C.

(57) ABSTRACT

The disclosure discloses a non-transitory computer-readable medium storing a content processing program. A computer executes steps including a first determination step, a first update step, a charging step, and a second update step. In the first determination step, it is determined whether or not an output voltage is equal to or greater than a predetermined threshold value. In the first update step, an update process of the content of which the update instruction is received is executed in the case that the output voltage is determined as being equal to or greater than the threshold value. In the charging step, a battery is charged until the output voltage becomes equal to or greater than the threshold value in the case that the output voltage is determined as being less than the threshold value.

9 Claims, 10 Drawing Sheets

(58) Field of Classification Search
CPC ........ G06F 3/1229; G06F 3/1221; G06F 8/60; G06K 15/4055; H04N 1/00885; H04N 1/00899

See application file for complete search history.

(56) References Cited

U.S. PATENT DOCUMENTS

| | | | |
|---|---|---|---|
| 2011/0231834 A1* | 9/2011 | Kim | G06F 1/3212 |
| | | | 717/173 |
| 2012/0200157 A1 | 8/2012 | Ohi | |
| 2014/0028246 A1* | 1/2014 | Martynowski | B41J 29/393 |
| | | | 320/107 |
| 2015/0007161 A1 | 1/2015 | Yagi | |
| 2016/0226262 A1* | 8/2016 | Fukubayashi | H01M 10/425 |

FOREIGN PATENT DOCUMENTS

| | | |
|---|---|---|
| JP | 2012178138 A | 9/2012 |
| JP | 2013-222419 A | 10/2013 |
| JP | 5475123 B2 | 4/2014 |
| JP | 2014-160340 A | 9/2014 |
| JP | 6185772 B2 | 8/2017 |
| JP | 2017-167721 A | 9/2017 |
| WO | 2015/033660 A1 | 3/2015 |

* cited by examiner

| DATA SIZE | | |
|---|---|---|
| 1 K BYTE OR LESS | GREATER THAN 1 K AND NOT MORE THAN 1 MB | GREATER THAN 1 MB |
| REFERENCE VOLTAGE THRESHOLD PER DOWNLOADING SIZE | 4.9V | 5.0V | 5.1V |
| REFERENCE VOLTAGE THRESHOLD PER INSTALLATION SIZE | 4.8V | 4.9V | 5.0V |

| CUT-OFF VOLTAGE THRESHOLD AT THE TIME OF REBOOT | 5.4V |
|---|---|

[FIG. 6B]

| | REBOOT |
|---|---|
| PROGRAM | REQUIRED |
| FONT | NOT REQUIRED |
| TEMPLATE | NOT REQUIRED |

[FIG. 7A]  AT REBOOT, CURRENT PHASE IS UNKNOWN (IN THIS EXAMPLE, SUBSTANTIALLY 6 O'CLOCK DIRECTION)

[FIG. 7B]  SEQUENTIALLY SWITCH PHASES (IN THIS EXAMPLE, 3 O'CLOCK DIRECTION)

[FIG. 7C]  (6 O'CLOCK DIRECTION)

[FIG. 7D]  (9 O'CLOCK DIRECTION)

[FIG. 7E]  ADJUSTMENT IS MADE TO CONSTANT POSITION (IN THIS EXAMPLE, 12 O'CLOCK DIRECTION) REGARDLESS OF WHERE IT IS

PRINTER CONFIGURED TO PERFORM PRINTING ON A PRINT-RECEIVING MEDIUM AND COMPUTER-READABLE MEDIUM

CROSS-REFERENCE TO RELATED APPLICATION

The present application claims priority from Japanese Patent Application No. 2018-009029, which was filed on Jan. 23, 2018, the disclosure of which is incorporated herein by reference in its entirety.

BACKGROUND

Field

The present disclosure relates to a medium recording a content processing program for processing a content such as various programs and a printer using the medium.

Description of the Related Art

A technique of acquiring a content such as various programs via a network for updating to a latest content is already known in a rechargeable battery-driven electronic device.

In the prior art, when an update instruction for the content is issued while a voltage of a battery is insufficient, a warning message is displayed on a display part without performing the update. In this case, a user must issue an update instruction again after charging the battery until the battery to a sufficient voltage, which increases a burden of an operation labor.

SUMMARY

An object of the present disclosure is to provide a medium recording a content processing program capable of reliably updating a content with one update instruction and reducing an operation labor and a printer using the medium.

In order to achieve the above-described object, according to aspect of the present application, there is provided a non-transitory computer-readable medium storing a content processing program for executing steps on a computer included in a battery-driven electronic device comprising a storage part configured to store a battery that is rechargeable and a connecting part configured to be connected to an external power source, the steps comprising an instruction reception step for receiving an update instruction for a content, a voltage acquisition step for acquiring an output voltage of the battery stored in the storage part, a first determination step for determining whether or not the output voltage acquired in the voltage acquisition step is equal to or greater than a predetermined threshold value, a first update step for executing an update process of the content of which the update instruction is received in the instruction reception step in the case that the output voltage is determined as being equal to or greater than the threshold value in the first determination step, a charging step for charging the battery with the external power source through the connecting part until the output voltage becomes equal to or greater than the threshold value in the case that the output voltage is determined as being less than the threshold value in the first determination step, and a second update step for executing the update process of the content of which the update instruction is received in the instruction reception step in the case that a charging of the battery is completed in the charging step.

DETAILED DESCRIPTION OF THE PREFERRED EMBODIMENTS

An embodiment of the present disclosure will now be described with reference to the drawings. In the following description, "up", "down", "front", "rear", and "width" used in the context of a label producing device 1 correspond to respective directions of arrows shown as needed in the figures such as FIG. 1, and "thickness" used in the context of the label producing device 1 refers to a thickness in a front-rear direction.

<Overall Structure of Label Producing Device>

Figure 1:
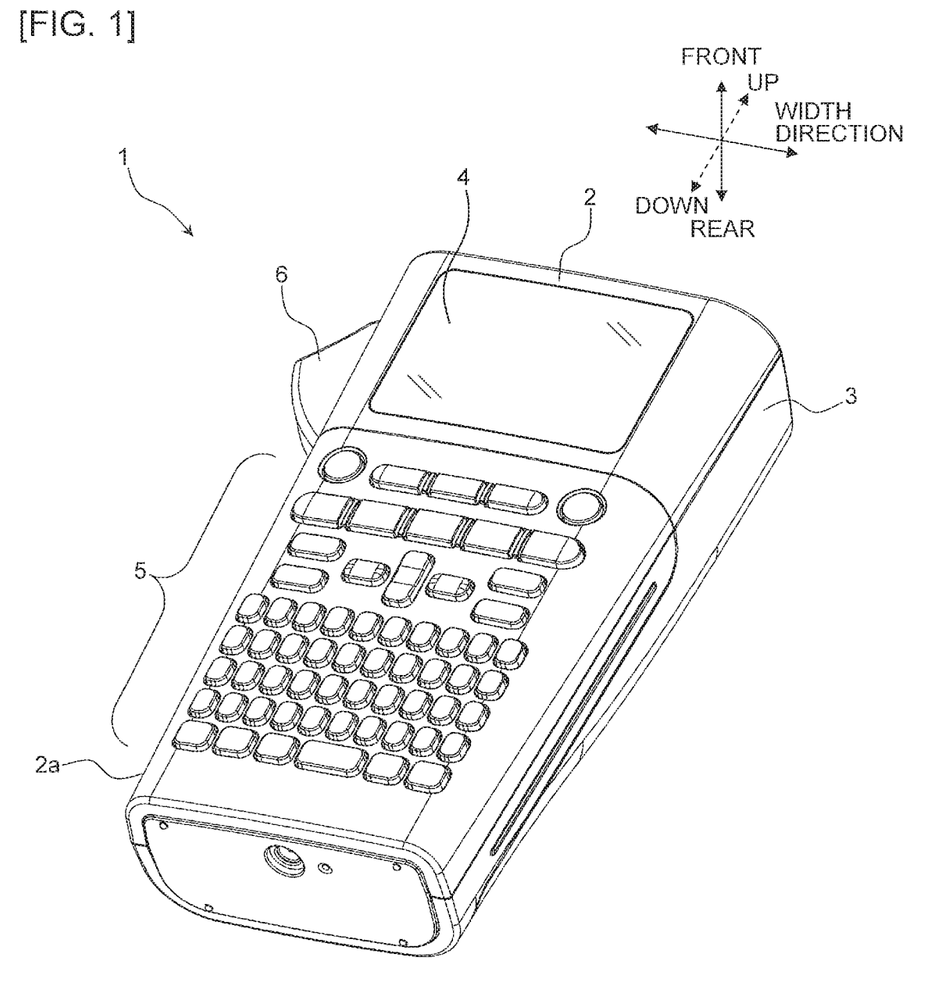
FIG. 1 is a perspective view showing an appearance of a label producing device related to an embodiment of the present disclosure.

As shown in FIG. 1, the label producing device 1 (corresponding to a printer) is a hand-held type rechargeable battery-driven electronic device held by an operator's hand. The label producing device 1 includes a device main body 2 and a cover 3 detachably attached to a rear surface of the device main body 2.

The device main body 2 has a thin and flat substantially rectangular parallelepiped shape elongated in the up-down direction. A front surface of the device main body 2 comprises a liquid crystal display part 4 (corresponding to a display) for displaying a desired display content (such as various data and settings) on an upper portion and a keyboard part 5 for operating the label producing device 1 on the lower side of the liquid crystal display part 4. The keyboard part 5 has keys arranged thereon including character keys of characters, signs, numeric characters, etc. as well as various function keys. A cut operation lever 6 for cutting a label tape with print is disposed on an upper portion of a side wall part 2a of the device main body 2 on one side in the width direction (the left side in FIG. 1).

<Label Producing Mechanism of Label Producing Device>

Figure 2:
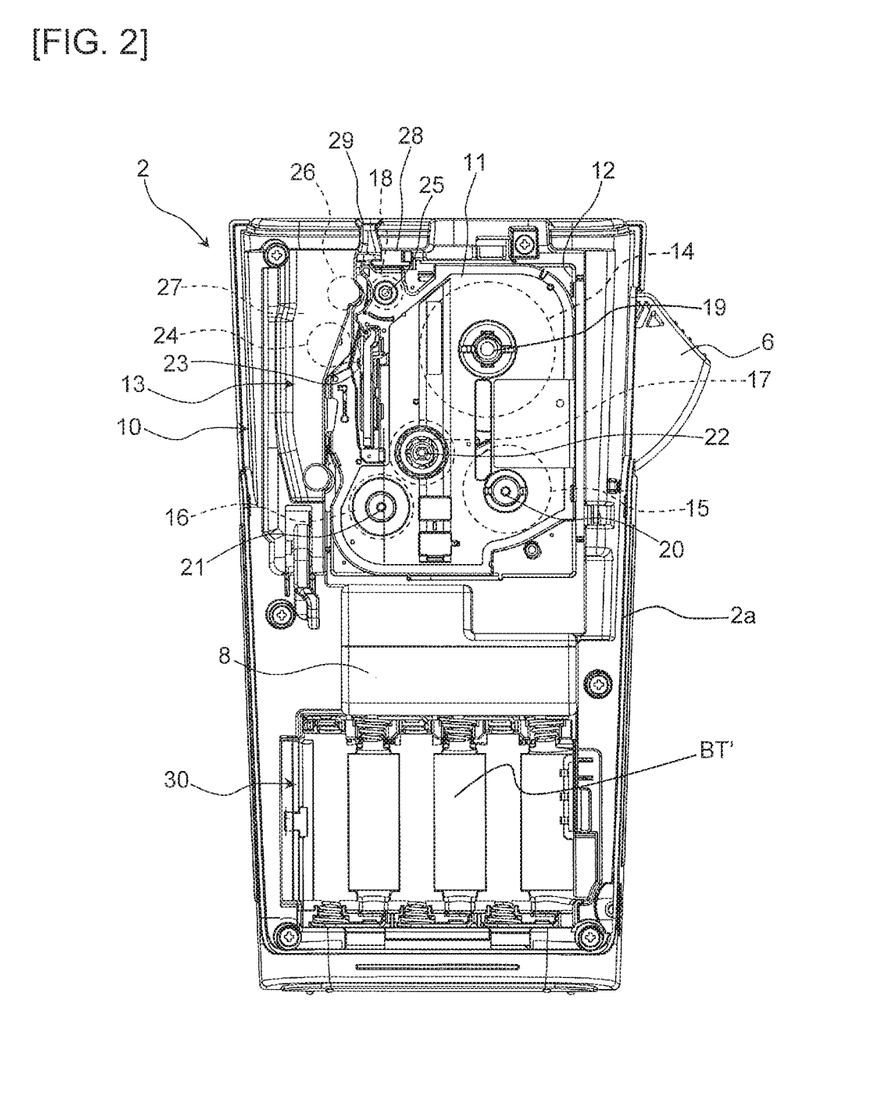
FIG. 2 is a plan view showing an internal structure of a device main body.

As shown in FIG. 2, the device main body 2 includes a label producing part 10 and a battery storage part 30 (corresponding to a storage part). The label producing part 10 and the battery storage part 30 are partitioned by an accommodating part accommodating a control board not shown and a pulse motor 63a for driving a platen roller 24 described later.

The label producing part 10 includes a concave-shaped cartridge holder 12 for detachably attaching a cartridge 11 and a printing/feeding mechanism 13 disposed on a region including the other side in the above described width direction of the cartridge holder 12 (the left side in FIG. 2). As shown in FIG. 2, the cartridge 11 includes a base tape roll 14, a cover film roll 15, an ink ribbon roll 16, an ink ribbon take-up roller 17, and a feeding roller 18 therein.

The printing/feeding mechanism 13 includes a support shaft 19 of the above described base tape roll 14, a support shaft 20 of the above described cover film roll 15, a support shaft 21 of the above described ink ribbon roll 16, a take-up shaft 22 for an ink ribbon, a thermal head 23 (corresponding to a printing head), a platen roller 24 (corresponding to a feeder), a drive shaft 25 of the feeding roller 18, a pressure roller 26, etc. The platen roller 24 and the pressure roller 26 are attached to a roll holder 27 and can be switched by swinging of the roll holder 27 between a printing/feeding position (position shown in FIG. 2) causing contact with the thermal head 23 and the feeding roller 18, respectively, and a standby position (not shown) away from the thermal head 23 and the feeding roller 18.

When a print label is produced, the platen roller 24 and the pressure roller 26 are switched to the above described printing/feeding position. The platen roller 24 switched to the printing/feeding position is driven to rotate by the pulse motor 63a (see FIG. 3 described later) on the side of the device main body 2 and presses a cover film (corresponding to a print-receiving medium. not shown) fed out from the cover film roll 15 and an ink ribbon (not shown) fed out from the ink ribbon roll 16 against the thermal head 23. As a result, the thermal head 23 performs a desired print on the cover film in accordance with print data, and the platen roller 24 feeds the cover film and the ink ribbon after the print toward the feeding roller 18. The ink ribbon after the print is subsequently separated from the cover film and taken up by the ink ribbon take-up roller 17.

On the other hand, the pressure roller 26 switched to the printing/feeding position presses the print-completed cover film fed by the platen roller 24 and a base tape (not shown) fed out from the above described base tape roll 14 against the feeding roller 18 driven to rotate by the drive shaft 25 linked to the pulse motor 63a (see FIG. 3 described later). As a result, while the print-completed cover film and the base tape are bonded to form a label tape with print, the feeding roller 18 feeds the label tape with print toward a label discharging exit 29 disposed at an upper end of the device main body 2. When an operator manually operates the cut operation lever 6 at a desired time point of discharge of the label tape with print from the label discharging exit 29, a cutter 28 located in the vicinity of the label discharging exit 29 is actuated to cut the label tape with print so that a print label of a desired length is formed.

The battery storage part 30 is formed as a recess having a substantially rectangular shape in planar view elongated in the width direction of the main body 2 of the device main body 2 and stores a rechargeable battery BT (see FIG. 3 described later). The print-label forming operation described above is performed by using an electric power supplied from the rechargeable battery BT. The battery storage part 30 is configured such that a dry battery BT can be stored instead of the above described rechargeable battery BT, and FIG. 2 shows an example of storing the dry battery BT.

<Control System of Label Producing Device>

Figure 3:
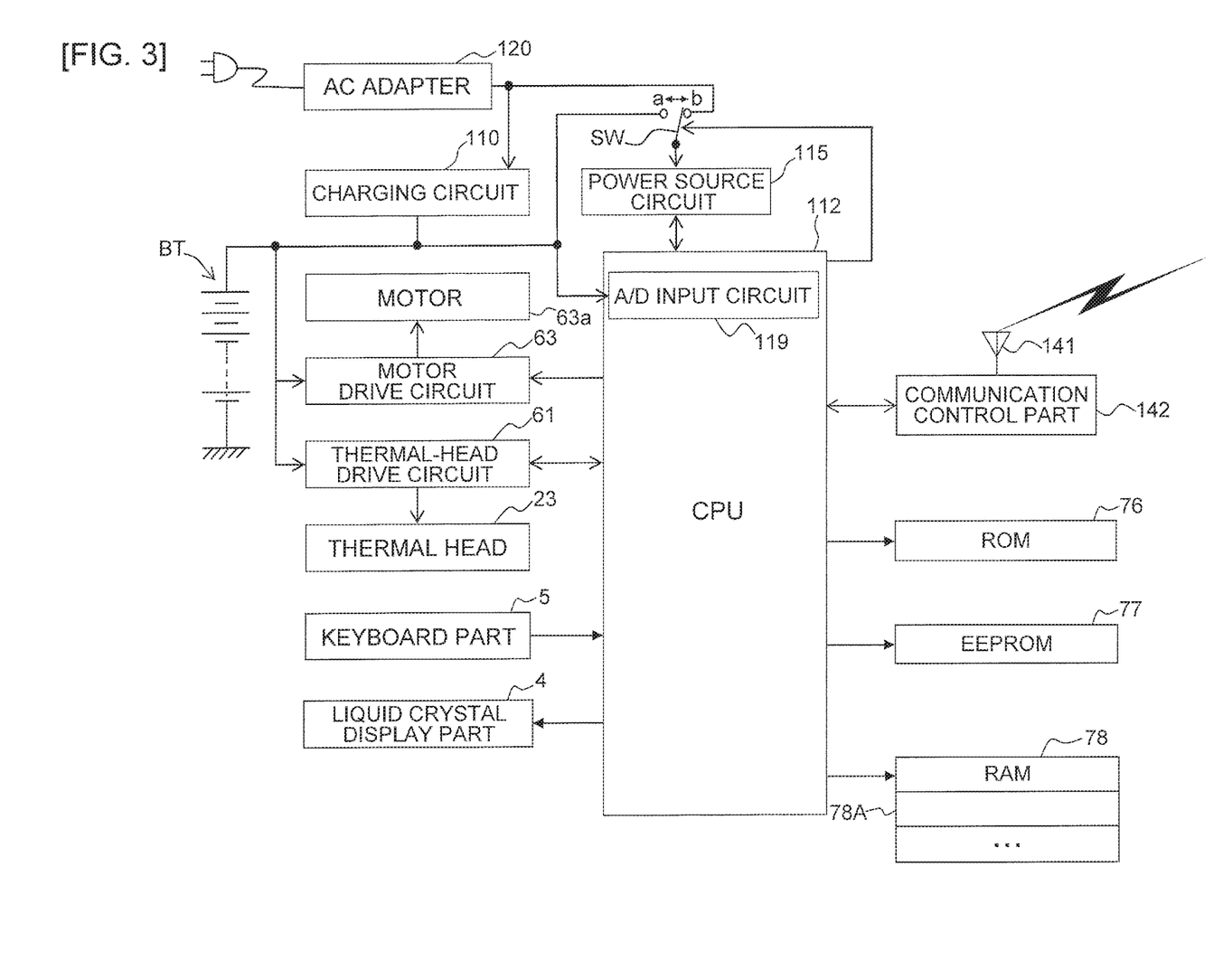
FIG. 3 is a functional block diagram showing a control system of the label producing device.

FIG. 3 shows a control system of the label producing device 1 (it is noted that the above described rechargeable battery BT is housed in the battery storage part 30). As shown in FIG. 3, a CPU 112 (corresponding to a computer and a controller) is disposed on a control board (not shown) of the label producing device 1, and the CPU 112 is connected to a ROM 76 (corresponding to a medium), a RAM 78, and an EEPROM 77 through a data bus. Instead of the EEPROM 77, a nonvolatile memory such as a flash memory may be used.

Various programs required for controlling the label producing device 1 (e.g., various control programs including a content processing program of this embodiment for executing procedures of flows of FIGS. 4 and 5 described later) are stored in the ROM 76. The CPU 112 performs various calculations on the basis of the various programs stored in the ROM 76.

The RAM 78 temporarily stores various calculation results from the CPU 112. The RAM 78 comprises a label image memory 78A etc.

The EEPROM 77 stores various pieces of information.

The CPU 112 is also connected to a thermal-head drive circuit 61, a motor drive circuit 63, the above described keyboard part 5, the above described liquid crystal display part 4, and a communication control part 142 including an antenna 141, etc.

The thermal-head drive circuit 61 drives the above described thermal head 23. Multiple heat generation elements (not shown) included in the above described thermal head 23 form dots on the above described cover film to perform printing under the control of the thermal-head drive circuit 61.

The motor drive circuit 63 rotationally drives the above described pulse motor 63a to control a rotation speed with a pulse signal applied to the pulse motor 63a. By driving the pulse motor 63a, the above described ink ribbon take-up roller 17 is rotated via a gear (not shown). The rotation of the above described gear is also transmitted to a platen roller gear and a pressure roller gear (not shown), and the platen roller gear and the pressure roller gear are rotated to rotate the above described platen roller 24 and the pressure roller 26.

The antenna 141 communicates with an appropriate access point, a base station, etc. through known mutual recognition wireless communication, for example, and performs information transmission/reception with an appropriate server via the access point, base station, etc. The communication control part 142 controls wireless communication performed via the above described antenna 141.

The CPU 112 also comprises an A/D input circuit 119 for measuring (detecting) an output voltage value of the above described rechargeable battery BT. The A/D input circuit 119 is connected to the above described rechargeable battery BT.

The rechargeable battery BT is a known rechargeable battery such as a layer-built nickel-hydrogen battery, for example, and is connected to a charging circuit 110 for executing a charging process on the rechargeable battery BT. The rechargeable battery BT is also connected to the above described motor drive circuit 63 and the thermal head control circuit 61 and is capable of supplying a desired voltage to each of the circuits. The charging circuit 110 can be connected to an external power source through an AC adapter 120 serving as a connecting part.

A power source circuit 115 can be connected through a switch SW switchable by a control signal from the CPU 112 to either the rechargeable battery BT (at the time of switching to a contact point a of FIG. 3) or the AC adapter 20 (at the time of switching to a contact point b of FIG. 3). This embodiment will basically be described by taking the case that the circuit is connected to the rechargeable battery BT (switched to the contact point a) as an example.

Feature of Embodiment

In the label producing device 1 of this embodiment, the user appropriately operates the keyboard part 5 etc. to update, for example, a firm program or an application program executed by the above described CPU 112 as well as font data, a template, etc. used for print formation (hereinafter collectively referred to as "content" as appropriate) to a latest version. In the case that the print-label forming operation is performed by using the electric power of the rechargeable battery BT as described above, an update instruction for the above described content may be issued while a voltage of the battery is insufficient due to a long time of use. A feature of this embodiment is that even in such a case, the rechargeable battery BT is first charged, and after the charging is completed, the content is automatically updated.

<Control Flow>

A control procedure executed by the CPU 112 to implement the above described feature will be described with reference to a flowchart shown in FIG. 4.

First, a step S10, the CPU 112 determines whether or not an update instruction for the above described content is issued through, for example, an appropriate operation (not described in detail) on the keyboard part 5 by the user. If no update instruction is issued, the determination of step S10 is negative (S10: NO), and this flow is terminated. If an update instruction is issued, the determination of step S10 is affirmative (S10: YES), and the procedure goes to step S20. Step S10 corresponds to an instruction reception step described in claims, and the process executed at step S10 corresponds to an instruction receiving process.

At step S20, the CPU 112 accesses the above described server through the above described wireless communication via the above described communication control part 142 and the antenna 141. The CPU 112 uses the above described access to acquire from the server, information on a type and a data size of a content to be updated (e.g., updated versions of the above described firm program and the above described application program, as well as the above described font data and the above described template usable in addition to those included as standard equipment in the label producing device 1, etc.).

Subsequently, at step S30, the CPU 112 calculates a communication speed in a communication environment in which the label producing device 1 is currently placed, by using a known technique such as measuring a communication time by performing trial communication using data having a known data amount. Subsequently, the procedure goes to step S40.

At step S40, the CPU 112 executes a determination voltage deciding process to decide a threshold of a voltage (hereinafter simply referred to as "voltage threshold" as appropriate. described in detail) used for determining whether or not to update the above described content.

Figure 5:
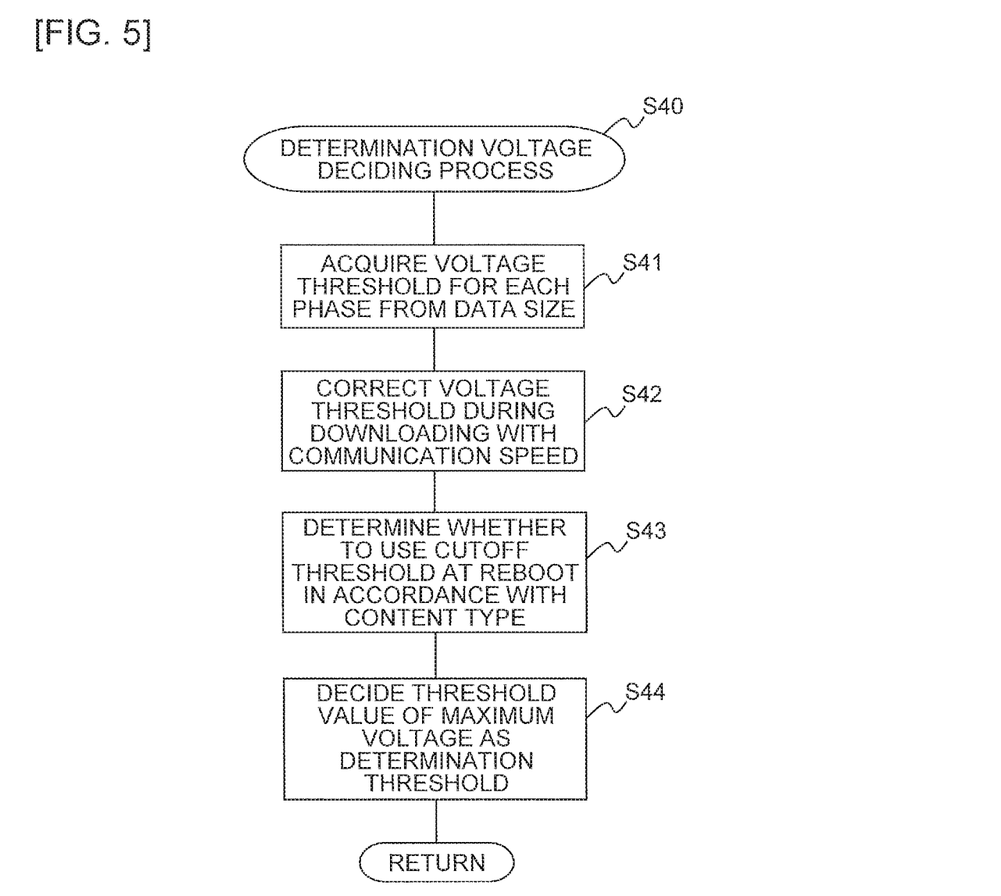
FIG. 5 is a flowchart showing a detailed procedure of step S40 of FIG. 4.

FIG. 5 shows a detailed procedure of step S40. In FIG. 5, first, at step S41, the CPU 112 acquires a voltage threshold for each processing stage of the content (hereinafter appropriately referred to as "phase") on the basis of the data size of the content to be updated acquired at step S20. The details will be described with reference to FIGS. 6A and 6B.

When a content update process is performed, multiple phases such as downloading and installation of data, reboot, etc. are sequentially executed, and required voltage values are different from each other. For example, since downloading is completed in a relatively short time, a voltage value required for accomplishing the process may not be so high. Since reboot consumes a large amount of electric power in the case that, for example, initial adjustment of a drive system is performed (described in detail later), the voltage value required for accomplishing the process becomes relatively high.

Focusing on the type of the content, for example, the above described font data has a large data amount and therefore makes the voltage value required for an update process higher as compared to template. Since programs such as firm programs and application programs require a reboot of the above described label producing device 1 at the time of an update process and therefore makes the voltage value required for the update process higher as compared to the other contents.

In this embodiment, due to such circumstances, the above described voltage threshold is determined for each of multiple phases of the content in accordance with a data size (in other words, a content type).

Figure 6A:
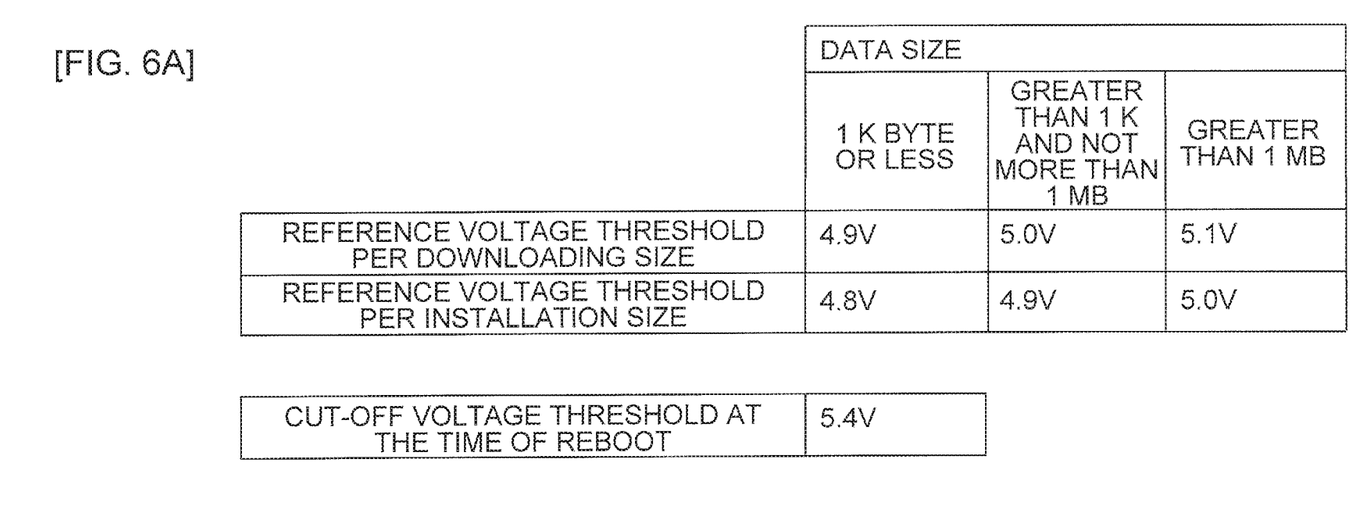
FIG. 6A is an explanatory diagram showing an example of a voltage threshold for each phase required at the time of content update.

For example, as shown in FIG. 6A, at the time of the above described downloading, the voltage threshold is set to 4.9 [V] in the case that the content size is 1 k byte or less, 5.0 [V] in the case that the content size is greater than 1 k byte and not more than 1 M byte, and 5.1 [V] in the case that the content size is greater than 1 M byte.

At the time of the above described installation, the voltage threshold is set to 4.8 [V] in the case that the content size is 1 k byte or less, 4.9 [V] in the case that the content size is greater than 1 k byte and not more than 1 M byte, and 5.0 [V] in the case that the content size is greater than 1 M byte.

At the time of the above described reboot, the voltage threshold is uniformly set to 5.4 [V] regardless of the content size.

With reference to the setting described above, at step S41, the CPU 112 acquires the voltage threshold of 4.9 [V] at the time of downloading, 4.8 [V] at the time of installation, and 5.4 [V] at the time of reboot in the case that the content to be updated acquired at step S20 has a data size of 1 k byte or less. The CPU 112 acquires the voltage threshold of 5.0 [V] at the time of downloading, 4.9 [V] at the time of installation, and 5.4 [V] at the time of reboot in the case that the data size is greater than 1 k byte and not more than 1 M byte. The CPU 112 acquires the voltage threshold of 5.1 [V] at the time of downloading, 5.0 [V] at the time of installation, and 5.4 [V] at the time of reboot in the case that the data size is greater than 1 M byte. Step S41 corresponds to a threshold value acquisition step described in claims. Subsequently, the procedure goes to step S42.

At step S42, on the basis of the communication speed measured at step S30, the CPU 112 corrects the voltage threshold at the time of downloading acquired at S41 (4.9 V, 5.0 V, and 5.1 V in the case that the data size is 1 k byte or less, greater than 1 k byte and not more than 1 M byte, and greater than 1 M byte, respectively). Specifically, the CPU 112 calculates an estimated download end time (in other words, a required time for downloading) from the above described communication speed and makes a correction for increasing/decreasing the above described voltage threshold in accordance with the time. Step S42 corresponds to a correction step described in claims. Subsequently, the procedure goes to step S43.

Figure 6B:
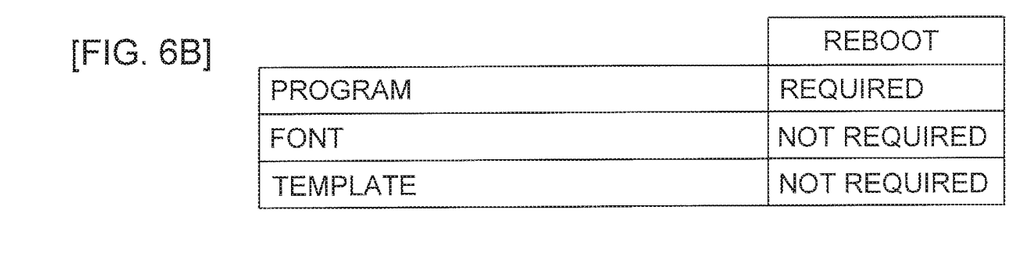
FIG. 6B is an explanatory diagram showing necessity/unnecessity of reboot of the label producing device at the time of content update for each content type.

At step S43, the CPU 112 determines whether or not to use a cutoff threshold at the time of reboot already described with reference to FIG. 6B in accordance with a type of the content to be updated acquired at step S20. As described above, programs such as firmware programs and application programs require a reboot of the label producing device 1 at the time of the update process (see FIG. 6B). On the other hand, the above described reboot is not required for the above described font data and the template (see FIG. 6B). From the above, at step S43, the CPU 112 determines that a reboot is required if the content to be updated acquired at step S20 is a program such as a firm program and an application program and determines that no reboot is required if the content is font data or a template.

The reason why the above described reboot consumes a large amount of electric power will be described with reference to FIGS. 7 and 8.

<Phase Adjustment Drive of Pulse Motor>

As described above, the pulse motor 63a is used in the label producing device 1. At the time of the above described reboot, a phase adjustment drive of the pulse motor 63a is performed as an initial adjustment of a drive system, and therefore, a large amount of electric power is consumed.

Figure 7A:
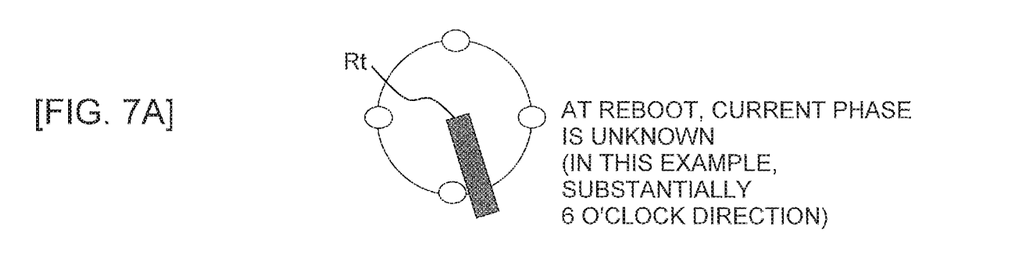
FIG. 7A is an explanatory diagram for conceptually explaining a behavior of sequential switching control of excitation phases in a pulse motor.
Figure 7B:
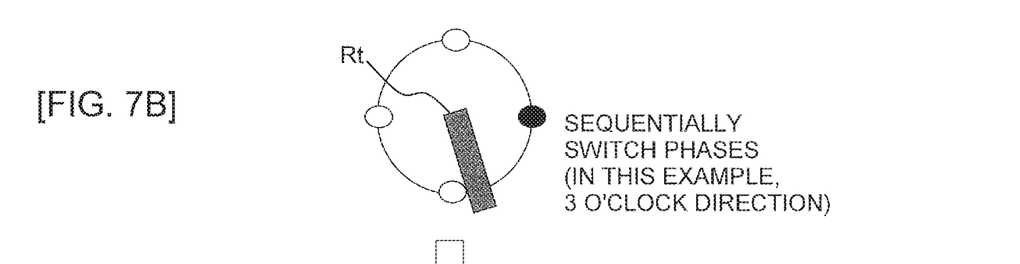
FIG. 7B is an explanatory diagram for conceptually explaining a behavior of sequential switching control of excitation phases in a pulse motor.
Figure 7C:
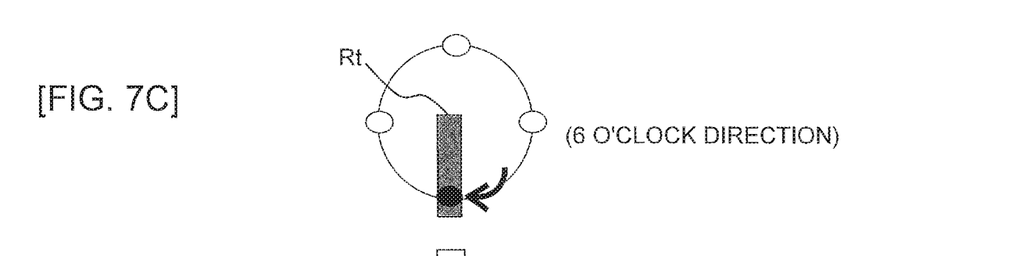
FIG. 7C is an explanatory diagram for conceptually explaining a behavior of sequential switching control of excitation phases in a pulse motor.
Figure 7D:
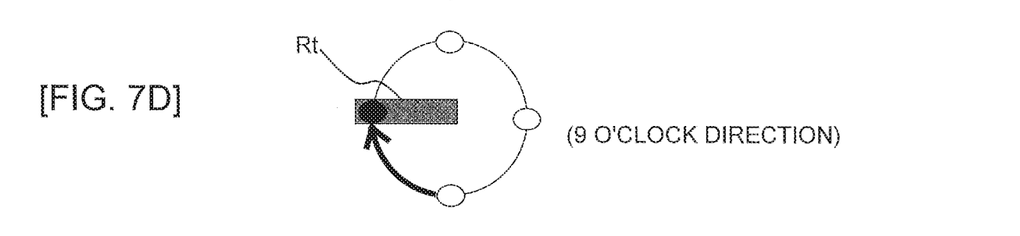
FIG. 7D is an explanatory diagram for conceptually explaining a behavior of sequential switching control of excitation phases in a pulse motor.
Figure 7E:
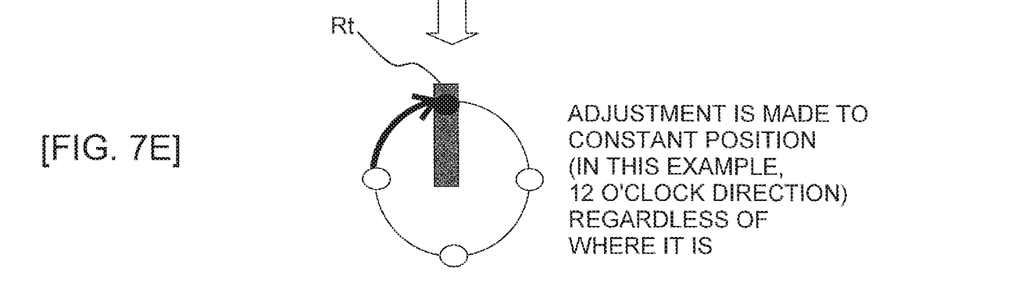
FIG. 7E is an explanatory diagram for conceptually explaining a behavior of sequential switching control of excitation phases in a pulse motor.

Specifically, the above described pulse motor 63a has a rotor rotated at a predetermined angle by applying one pulse signal (switching an excitation phase to the next state), and a rotation speed is controlled by reducing or increasing an interval at which the pulse is applied. For example, when the above described reboot is performed, it is unknown which excitation phase the rotor Rt stays in as shown in FIG. 7A. Therefore, under the control of the CPU 112, the excitation phase is sequentially switched. For example, the excitation phase is switched to the 3 o'clock direction as shown in FIG. 7B, further switched to the 6 o'clock direction as shown in FIG. 7C, further switched to the 9 o'clock direction as shown in FIG. 7D, and finally switched to the 12 o'clock direction as shown in FIG. 7E. With the switching as described above, the rotor Rt is adjusted to a constant position (in this case, the 12 o'clock direction) at the time of boot regardless of where the rotor Rt is. As a result of the phase adjustment drive of the pulse motor 63a performed at the time of reboot of the label producing device 1 in this way, a higher voltage is accordingly required.

<Initial Check of Roller Holder Sensor>

As described above, the label producing device 1 has the platen roller 24 and the pressure roller 26 attached to the roll holder 27, and the above described printing/feeding position and the above described standby position are switched by swinging of the roll holder 27. This switching is detected by a roll holder sensor HS, and at the time of the above described reboot, the above described roll holder 27 is driven to swing for performing an initial check of the roll holder sensor HS.

Figure 8A:
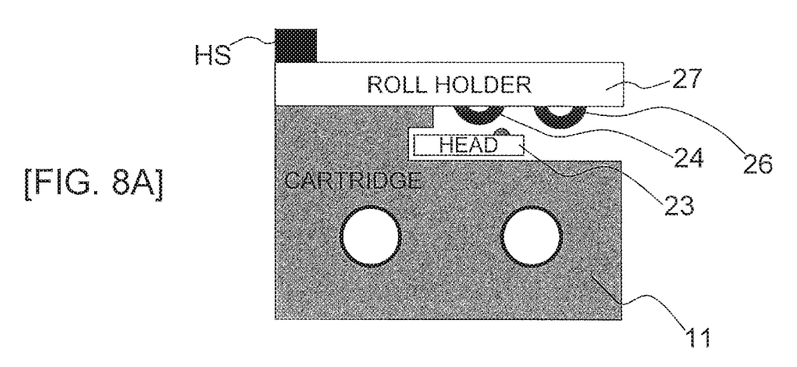
FIG. 8A is an explanatory view showing a behavior of an initial check of a roll holder sensor.
Figure 8B:
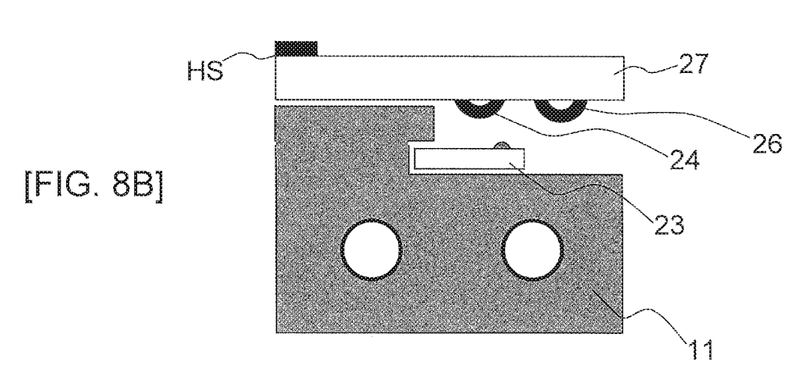
FIG. 8B is an explanatory view showing a behavior of an initial check of a roll holder sensor.

Specifically, the roll holder 27 is swung between the above described printing/feeding position shown in FIG. 8A and the above described standby position shown in FIG. 8B, and the CPU 112 checks whether or not the switching of the position is correctly detected by the roll holder sensor HS. Therefore, a large amount of electric power is consumed.

Once step S43 is completed as described above, the procedure goes to step S44.

At step S44, among the thresholds for the respective phases decided through steps S41-S43 for the content to be updated acquired in step S20, the CPU 112 decides the threshold of the maximum voltage as a final determination threshold of the content. As a result, the update process can be executed when the phase with the largest power consumption and the largest burden on the battery can reliably be completed. Subsequently, this routine is terminated, and the procedure goes to step S50 of FIG. 4.

Returning to FIG. 4, at step S50, the CPU 112 acquires the output voltage value of the above described rechargeable battery BT stored in the battery storage part 30, which is detected by the above described A/D input circuit 119. Step S50 corresponds to a voltage acquisition step described in claims, and the process executed at step S50 corresponds to a voltage acquisition process described in claims.

Subsequently, at step S60, the CPU 112 determines whether or not the output voltage of the battery acquired at step S50 is equal to or greater than the threshold decided at step S44. If the output voltage is equal to or greater than the threshold, the determination of step S60 is affirmative (S60: YES), and the procedure goes to step S70. Step S60 corresponds to a first determination step described in claims, and the process executed at step S60 corresponds to a first determination process described in claims.

At step S70, the CPU 112 executes the update process for the content to be updated (the content of the update instruction received at step S10) with a known method and terminates this flow. Step S70 corresponds to a first update step described in claims, and the process executed at step S70 corresponds to a first update process described in claims.

On the other hand, if the above described output voltage is less than the threshold at step S60, the determination of step S60 is negative (S60: NO), and the procedure goes to step S80.

At step S80, the CPU 112 determines whether or not the rechargeable battery BT stored in the battery storage part 30 is in a rechargeable state. Specifically, the CPU 112 determines with a known method whether or not the above described charging circuit 110 is connectable through the AC adapter 120 to an external power source, for example. If the rechargeable battery BT is in a rechargeable state, the determination of step S80 is affirmative (S80: YES), and the procedure goes to step S90.

Figure 9:
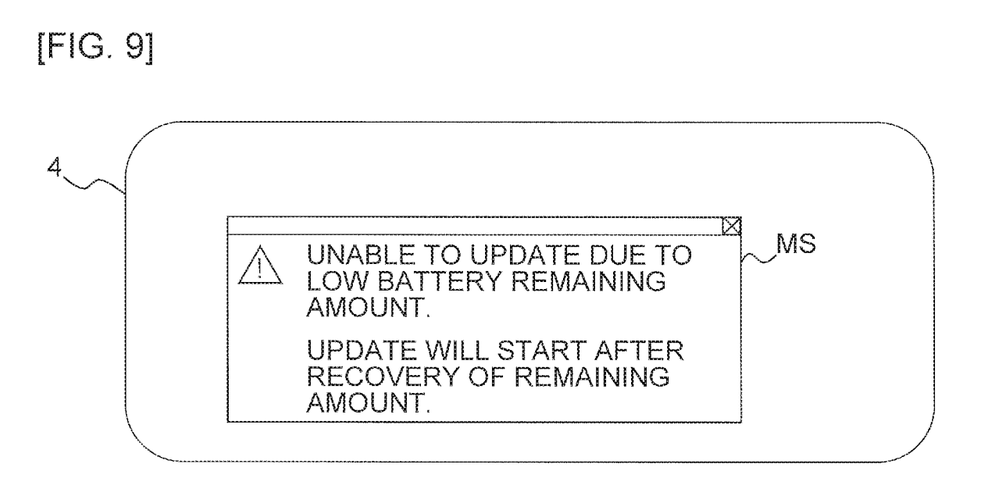
FIG. 9 is an explanatory diagram showing a display example of a message on a liquid crystal display part.

At step S90, the CPU 112 outputs a display control signal to the above described liquid crystal display part 4 to display a predetermined message prompting charging. FIG. 9 shows an example of the message display and, in this example, a message MS displayed on the liquid crystal display part 4 is "unable to update due to low battery remaining amount. update will start after recovery of remaining amount". Step S90 corresponds to a display step described in claims.

Subsequently, at step S100, the CPU 112 executes a charging process of the rechargeable battery BT for a desired amount with the charging circuit 110 connected though the above described AC adapter 120 to the external power source. Subsequently, the procedure returns to step S50, and the same procedure is repeated thereafter. As a result, the flow is repeated through steps S50→S60→S80→S90→S100→S50 etc. until the above described output voltage reaches the above described threshold (i.e., full charge is not necessarily required). When the above described output voltage reaches the threshold, the content update process is executed at step S70 as described above. Step S100 corresponds to a charging step described in claims, and step S70 following the affirmative determination of step S60 as described above corresponds to a second update step described in claims. Similarly, the process executed at step S100 corresponds to a charging process described in claims, and the process executed at step S70 following the affirmative determination of step S60 as described above corresponds to a second update process described in claims.

On the other hand, if the rechargeable battery BT cannot be charged at step S80, for example, in such a case that the device is used in an outdoor environment etc. where charging cannot be performed, the determination of step S80 is negative (S80: NO), and the procedure goes to step S110. At step S110, the CPU 112 refers to the above described voltage thresholds of the respective phases of the content to be updated decided at steps S41 to S43 on the basis of the setting of FIG. 6A to determine whether or not the update can be performed to a middle phase (rather than a final phase for completing the update process). In other words, on the premise that charging is not performed, the CPU 112 determines whether or not the update can be accomplished to somewhere in the middle of the above described multiple phases without changing an insufficient output voltage. Step S110 corresponds to a second determination step described in claims.

For example, in the case that the content to be updated is firmware and the output voltage of the above described rechargeable battery BT is 5.2 [V], the content can be downloaded and installed as shown in FIG. 6A (since the above described voltage threshold is 5.2 V or less). The reboot cannot be performed due to insufficient electric power (since the above described cut-off voltage threshold is 5.4 V).

For example, in the case that a font (or a template) has a data size of 1 k byte and that the output voltage of the above described rechargeable battery BT is 4.7 [V], the corresponding voltage threshold of downloading is 4.9 [V] as shown in FIG. 6A; however, in the case that the above described voltage threshold is minus-corrected to 4.7 [V] due to a relatively high communication speed at step S42, the content can at least be downloaded. The installation cannot be performed due to insufficient electric power (since the above described voltage threshold is 4.8 V).

At step S110, in the case that the update cannot be performed even to a middle phase due to, for example, a situation in the outdoors with a less favorable communication environment as described above, the determination is negative (S110: NO) so that the procedure goes to step S130 to execute an error process such as appropriate display on the above described liquid crystal display part 4, and this flow is terminated.

On the other hand, if the update can be performed to a middle phase (e.g., downloading, installation, only downloading and installation when reboot is required, ore only downloading when downloading and installation is required), the determination is affirmative (S110: YES), and the procedure goes to step S120.

At step S120, the CPU 112 executes the update process to the middle phase determined as being accomplishable at step S110. Step S120 corresponds to a third update step described in claims. Subsequently, this flow is terminated.

The present disclosure is not limited to the above described embodiment and can variously be modified without departing from the spirit and the technical ideas thereof. Such modification examples will hereinafter be described.

(1) In the Case that Drive Adjustment of Cutter is Performed at the Time of Reboot The label producing device 1 is configured such that the cutter 28 is actuated by manually operating the cut operation lever 6; however, the present disclosure is not limited thereto, and, for example, the device may be configured such that a movable blade is driven by a solenoid etc., to move toward and away from a fixed blade. In this case, the initial adjustment of the drive system in the label producing device 1 includes an adjustment of the movable blade.

Figure 10A:
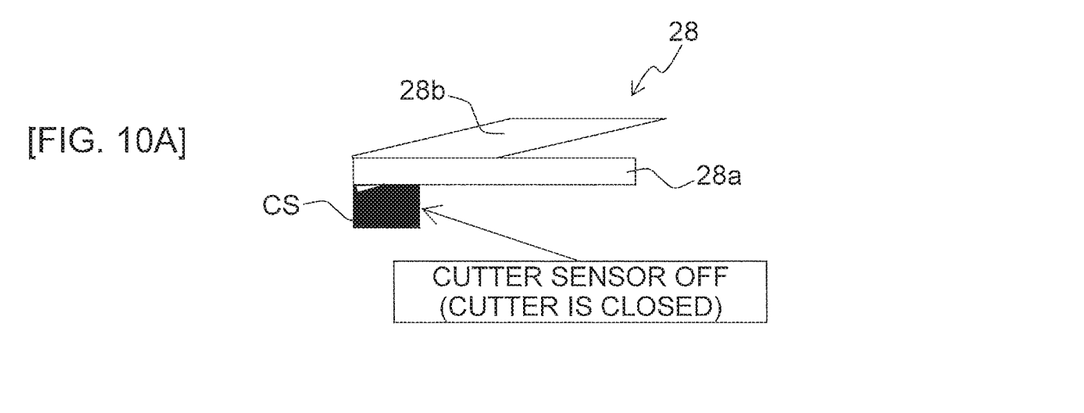
FIG. 10A is an explanatory diagram showing a behavior of an initial check of a cutter sensor.
Figure 10B:
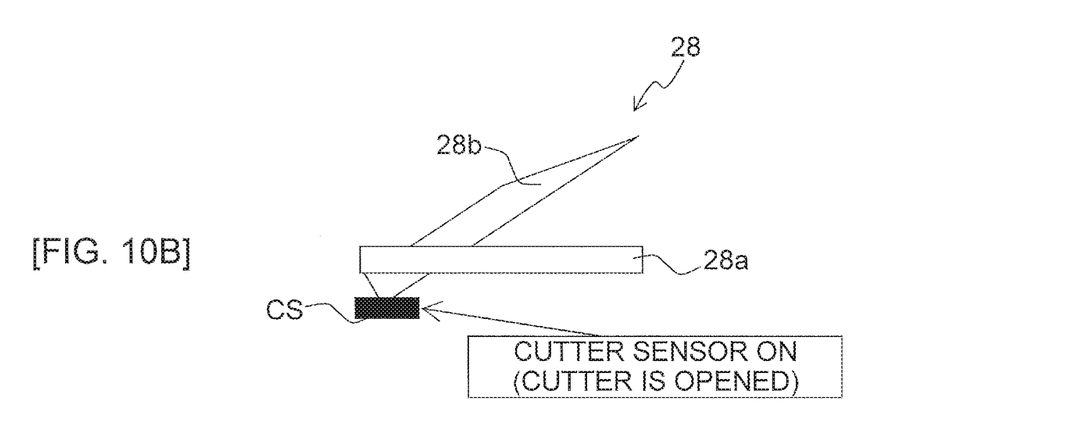
FIG. 10B is an explanatory diagram showing behavior of an initial check of a cutter sensor.

In this case, for example, as shown in FIGS. 10A and 10B, a movable blade 28b is driven to open and close with respect to a fixed blade 28a included in the cutter 28. An electrically-operated cutter sensor CS for checking this opening/closing operation is disposed, and at the time of the above described reboot of the label producing device 1, the above described movable blade 28b is driven to open and close for an initial check of the cutter sensor CS.

Specifically, the opening/closing drive of the movable blade 28b is performed between a cutter closed state shown in FIG. 10A and a cutter opened state shown in FIG. 10B, and the CPU 112 checks whether or not the opening/closing drive is correctly detected by the cutter sensor CS. Therefore, a large amount of electric power is consumed.

The label producing device 1 comprising the cutter 28 having such a configuration also requires a high voltage when a reboot is required for the content update process as described above.

(2) In the Case that an Amount of Charging During the Update Process of Each Phase is Taken into Consideration In the content update performed as described above, for example, when multiple phases are sequentially performed in order of downloading, installation, etc., the charging can actually be performed even while the phases are performed. In view of this point, at step S60 of FIG. 4, the CPU 112 may calculate a required time for each phase and may make the determination with consideration given to an amount of voltage usable for the charging during the time.

As a result, for example, even if the above described output voltage acquired at step S50 is somewhat smaller than the voltage threshold determined at step S44, the procedure is immediately shifted to step S70 (and charging is concurrently performed in this case) to execute the content update process.

(3) In the Case that an Idle State is Used as a Condition

Specifically, the CPU 112 may determine whether or not the label producing device 1 is in the idle state for a predetermined period (corresponding to a third determination procedure) and may execute the update process of step S70 or step S120 on condition that the device is in the idle state for a predetermined period.

(4) Others

Although the present disclosure is applied to the label producing device 1 that is a printer serving as the electronic device in the above description, the present disclosure is not limited thereto. Specifically, the present disclosure is applicable to any other electronic devices including the rechargeable battery BT in a rechargeable state and executing a charging process for the rechargeable battery BT. Examples of the devices include other types of portable or transportable printing devices such as a mobile printer, a notebook computer, a digital camera, and a portable terminal. Even in the case that the present disclosure is applied to these devices, the above described same advantage is acquired as described above.

The arrows shown in FIG. 3 indicate an example of a signal flow and are not intended to limit the signal flow directions.

Figure 4:
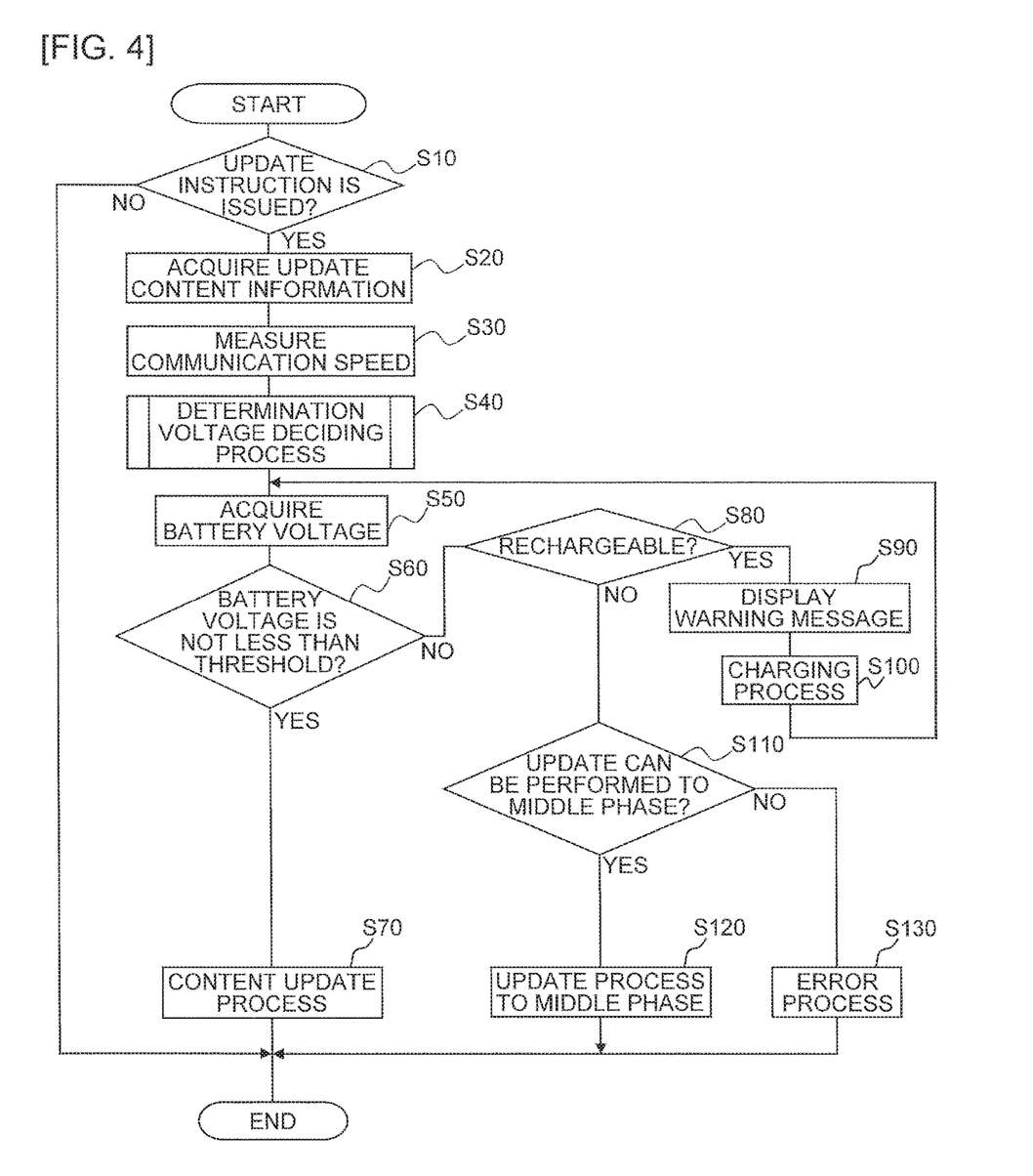
FIG. 4 is a flowchart showing a control procedure executed by a CPU.

The flowcharts shown in FIGS. 4 and 5 are not intended to limit the present disclosure to the above described flows, and the procedures may be added/deleted or may be executed in different order without departing from the spirit and the technical ideas of the disclosure.

The techniques of the above described embodiment may appropriately be utilized in combination other than those described above.

What is claimed is:

1. A non-transitory computer-readable medium storing a content processing program for executing steps on a computer included in a battery-driven electronic device comprising a storage part configured to store a battery that is rechargeable and a connecting part configured to be connected to an external power source, said steps comprising:
   an instruction reception step for receiving an update instruction for a content;
   a first voltage acquisition step for acquiring an output voltage of said battery stored in said storage part;
   a first determination step for determining whether or not said output voltage acquired in said first voltage acquisition step is equal to or greater than a predetermined threshold value;
   a first update step for executing an update process of said content of which the update instruction is received in said instruction reception step in the case that said output voltage is determined as being equal to or greater than said predetermined threshold value in said first determination step;
   a charging step for charging said battery with said external power source through said connecting part in the case that said output voltage is determined as being less than said predetermined threshold value in said first determination step;
   a second voltage acquisition step for acquiring an output voltage of said battery charged with said external power source;
   a charging determination step for determining whether or not said output voltage acquired in said second voltage acquisition step is equal to or greater than the predetermined threshold value, wherein the predetermined threshold value is less than a fully charged value;
   a second update step for executing the update process of said content of which the update instruction is received in said instruction reception step in the case that said output voltage is determined as being equal to or greater than said predetermined threshold value in said charging determination step;
   a threshold value acquisition step for acquiring said predetermined threshold value for each of multiple processing stages of said content of which the update instruction is received in said instruction reception step, wherein the multiple processin. stages includes a downloading stage of the content, an installation stage after downloading of the content, and a reboot stage of said battery-driven electronic device after installation of the content in said update process;
   a threshold determination step for determining a maximum value of said predetermined threshold values respectively acquired. in said threshold value acquisition step as a threshold for determining; and
   a use determination step for determining whether or not to use said predetermined threshold value in said reboot stage at a determination in said threshold determination step in accordance with a type of the content.

2. The non-transitory computer-readable medium according to claim 1, wherein
   said predetermined threshold value is determined for each type of said content.and wherein
   in said first determination step, said determination is made by using said predetermined threshold value corresponding to said type of said content of which the update instruction is received in said instruction reception step.

3. The non-transitory computer-readable medium according to claim 1, wherein
   said steps further comprise:
   a correction step for correcting said predetermined threshold value in said downloading stage acquired in said threshold value acquisition step in accordance with a communication speed.

4. The non-transitory computer-readable medium according to claim 1, wherein
   in said first determination step, a required time is calculated for each of the processing stages on the basis of said predetermined threshold values of the respective processing stages of said content acquired in said threshold value acquisition step to make said determination with consideration given to a voltage capable of charging during the required time calculated.

5. The non-transitory computer-readable medium according to claim 1, wherein
   said steps further comprise
   a second determination step determining to which processing stage the update process is accomplishable with the output voltage among the multiple processing stages, on the basis of said predetermined threshold values of the respective processing stages of said content acquired in said threshold value acquisition step in the case that said output voltage is determined as being less than said predetermined threshold value in said first determination step, and
   a third update step for executing said update process to the processing stage determined as being accomplishable in said second determination step.

6. The non-transitory computer-readable medium according to claim 1, wherein
   said steps further comprise a third determination step for determining whether or not said electronic device is in an idle state for a predetermined period, and wherein
   in said first update step, said update process is executed in the case that said electronic device is determined as being in said idle state for said predetermined period in said third determination step.

7. The non-transitory computer-readable medium according to claim 1,
   said steps further comprise a display step for displaying a message prompting charging on said display device included in said electronic device in the case that said output voltage is determined as being less than said predetermined threshold value in said first determination step.

8. The non-transitory computer-readable medium according to claim 1, wherein said predetermined threshold value for said download stage and said predetermined threshold value for said installation stage are respectively set to be variable in accordance with a data size of said content, and said predetermined threshold value for said reboot stage is set to be a fixed value.

9. A printer comprising:
a feeder configured to feed a print-receiving medium;
a printing head configured to form a print on said print-receiving medium fed by said feeder;
a storage part configured to store a battery that is rechargeable and configured to supply electric power to said feeder and said printing head;
a connecting part configured to be connected to an external power source; and
a controller,
the printer being configured to perform printing on said print-receiving medium by cooperation between said feeder and said printing head,
said controller executing
an instruction reception process for receiving an update instruction for a content related to said printing,
a first voltage acquisition process for acquiring an output voltage of said battery stored in said storage part,
a first determination process for determining whether or not said output voltage acquired in said first voltage acquisition process is equal to or greater than a predetermined threshold value,
a first update process for updating said content of which the update instruction is received in said instruction reception process in the case that said output voltage is determined as being equal to or greater than said predetermined threshold value in said first determination process,
a charging process for charging said battery with said external power source through said connecting part in the case that said output voltage is determined as being less than said predetermined threshold value in said first determination process,
a second voltage acquisition process for acquiring an output voltage of said battery charged with said external power source,
a charging determination process for determining whether or not said output voltage acquired in said second voltage acquisition process is equal to or greater than the predetermined threshold value, wherein the predetermined threshold value is less than a fully charged value,
a second update process for updating said content of which the update instruction is received in said instruction reception process in the case that said output voltage is determined as being equal to or greater than said predetermined threshold value in said charging determination process,
a threshold value acquisition process for acquiring said predetermined threshold value for each of multiple processing stages of said content of which the update instruction is received in said instruction reception process, wherein the multiple processing stages includes a downloading stage of the content, an installation stage after downloading of the content, and a reboot stage of said priner after installation of the content in said update process,
a threshold determination process for determining a maximum value of said predetermined threshold values respectively acquired in said threshold value acquisition process as a threshold for determining, and
a use determination process for determining whether or not to use said predetermined threshold value in said reboot stage at a determination in said threshold determination process in accordance with a type of the content.

* * * * *

UNITED STATES PATENT AND TRADEMARK OFFICE
CERTIFICATE OF CORRECTION

PATENT NO. : 10,949,141 B2
APPLICATION NO. : 16/234909
DATED : March 16, 2021
INVENTOR(S) : Keigo Kako It is certified that error appears in the above-identified patent and that said Letters Patent is hereby corrected as shown below:

In the Claims

Column 11, Claim 1, Line 65 should read:
wherein the multiple processing stage includes Column 14, Claim 9, Line 24 should read:
include a downloading stage of the content, an instal- Signed and Sealed this
Third Day of August, 2021

Drew Hirshfeld
*Performing the Functions and Duties of the*
*Under Secretary of Commerce for Intellectual Property and*
*Director of the United States Patent and Trademark Office*